(12) United States Patent
Mizuno et al.

(10) Patent No.: US 10,138,559 B2
(45) Date of Patent: Nov. 27, 2018

(54) CHEMICAL CONVERSION AGENT AND METAL SURFACE TREATMENT METHOD

(71) Applicant: NIPPON PAINT SURF CHEMICALS CO., LTD., Tokyo (JP)

(72) Inventors: Akihiro Mizuno, Tokyo (JP); Norizumi Matsui, Tokyo (JP)

(73) Assignee: NIPPON PAINT SURF CHEMICALS CO., LTD., Tokyo (JP)

( * ) Notice: Subject to any disclaimer, the term of this patent is extended or adjusted under 35 U.S.C. 154(b) by 218 days.

(21) Appl. No.: 14/782,100

(22) PCT Filed: Apr. 3, 2014

(86) PCT No.: PCT/JP2014/059899
§ 371 (c)(1),
(2) Date: Oct. 2, 2015

(87) PCT Pub. No.: WO2014/163165
PCT Pub. Date: Oct. 9, 2014

(65) Prior Publication Data
US 2016/0040298 A1    Feb. 11, 2016

(30) Foreign Application Priority Data
Apr. 3, 2013 (JP) ................. 2013-078003

(51) Int. Cl.
| C23C 22/44 | (2006.01) |
| C23C 22/34 | (2006.01) |
| C23C 22/40 | (2006.01) |
| C09D 5/08 | (2006.01) |
| C23C 22/82 | (2006.01) |
| C23C 22/00 | (2006.01) |

(52) U.S. Cl.
CPC ............... *C23C 22/40* (2013.01); *C09D 5/08* (2013.01); *C09D 5/084* (2013.01); *C23C 22/44* (2013.01); *C23C 22/82* (2013.01)

(58) Field of Classification Search
CPC ....... C23C 22/34; C23C 22/361; C23C 22/40; C23C 22/44
USPC ...................................... 148/247
See application file for complete search history.

(56) References Cited

U.S. PATENT DOCUMENTS

| 4,992,115 A | 2/1991 | Ikeda |
| 6,361,833 B1 | 3/2002 | Nakada et al. |
| 6,736,908 B2 | 5/2004 | Sako et al. |
| 6,869,677 B1 | 3/2005 | Uehara et al. |
| 7,029,522 B2 | 4/2006 | Matsui et al. |
| 2003/0168127 A1 | 9/2003 | Hamamura et al. |
| 2003/0209293 A1 | 11/2003 | Sako et al. |
| 2006/0027629 A1 | 2/2006 | Inbe et al. |
| 2007/0068602 A1 | 3/2007 | Pemberton et al. |
| 2008/0230394 A1 | 9/2008 | Inbe et al. |
| 2010/0170594 A1 | 7/2010 | Inbe et al. |
| 2013/0034743 A1 | 2/2013 | Bannai et al. |
| 2013/0284049 A1 | 10/2013 | Miura et al. |
| 2014/0223740 A1 | 8/2014 | Matsui et al. |
| 2015/0013947 A1 | 1/2015 | Matsui et al. |
| 2016/0040298 A1 | 2/2016 | Mizuno et al. |
| 2016/0060765 A1 | 3/2016 | Mizuno et al. |

FOREIGN PATENT DOCUMENTS

| CN | 1330729 A | 1/2002 |
| CN | 1386901 A | 12/2002 |
| CN | 1730725 A | 2/2006 |
| EP | 1 136 591 A1 | 9/2001 |
| JP | 1-208477 A | 8/1989 |
| JP | 2000199077 A | 7/2000 |
| JP | 2000-345362 A | 12/2000 |
| JP | 2001-181860 A | 7/2001 |
| JP | 2002030460 A | 1/2002 |
| JP | 2002-60699 A | 2/2002 |
| JP | 2002145549 A | 5/2002 |
| JP | 2002-275650 A | 9/2002 |
| JP | 2005008975 A | 1/2005 |
| JP | 2005-36161 A | 2/2005 |
| JP | 2007023353 A | 2/2007 |
| JP | 2008088551 A | 4/2008 |
| JP | 2008088552 A | 4/2008 |

(Continued)

OTHER PUBLICATIONS

An International Search Report from corresponding International Application No. PCT/JP2013/056548 dated May 28, 2013; 5 pgs.
A Notification that the JP Patent Office has received an Information Statement by a third party dated Aug. 18, 2015 in Japanese Application No. 2012-053032; 3 pgs.
An Office Action from corresponding Chinese Patent Application No. 201380012357.5 dated Oct. 19, 2015; 9 pgs.
A Notification that the JP Patent Office has received an Information Statement by a third party dated Jun. 28, 2016 in Japanese Application No. 2012-53032; 3 pgs.

(Continued)

*Primary Examiner* — Lois L Zheng
(74) *Attorney, Agent, or Firm* — Muncy, Geissler, Olds & Lowe, P.C.

(57) ABSTRACT

Provided is a chemical conversion agent that, with respect to an aluminum metal material, etc., contributes to superior corrosion and moisture resistance, contributes to superior adhesion with a laminate film, and contributes to superior hydrofluoric acid and alkali resistance. The chemical conversion agent includes: one or more type of metal element (A) selected from a group comprising of zirconium, titanium, and hafnium; vanadium element (B); and a resin (C). The resin (C) includes a polyvinyl alcohol resin (C1). The ratio (Wa/Wb) of the weight-based total content (Wa) of the metal element (A) relative to the weight-based content (Wb) of vanadium element (B) is 0.1-15, and the ratio ((Wa+Wb)/Wc1) of the weight-based total content (Wa+Wb) of the metal element (A) and the vanadium element (B) relative to the weight-based total content (Wc1) of the polyvinyl alcohol resin (C1) is 0.25-15.

6 Claims, No Drawings

(56) References Cited

FOREIGN PATENT DOCUMENTS

| | | |
|---|---|---|
| JP | 2008-183523 A | 8/2008 |
| JP | 2009-84516 A | 4/2009 |
| JP | 2009084702 A | 4/2009 |
| JP | 2009-132952 A | 6/2009 |
| JP | 2009263732 A | 11/2009 |
| JP | 2010-261058 A | 11/2010 |
| JP | 2011-042842 A | 3/2011 |
| JP | 2011-195942 A | 10/2011 |
| JP | 2011-214106 A | 10/2011 |
| JP | 2011214105 A | 10/2011 |
| JP | 2012017524 A | 1/2012 |
| KR | 10-2001-0099697 A | 11/2011 |
| WO | WO 00/22188 A1 | 4/2000 |
| WO | WO 00/24948 A1 | 5/2000 |
| WO | WO 01/48264 A1 | 7/2001 |
| WO | WO 2011/155538 A1 | 12/2011 |
| WO | WO2013/042725 A1 | 3/2013 |

OTHER PUBLICATIONS

An English translation of the Written Opinion of the International Search Authority dated May 28, 2013 for PCT/JP2013/056548; 6 pgs.
http://www.chemspider.com/Chemical-Structure.6885.html; ChemSpider Search Authority Search and Share Chemistry; 4 pgs.
An Office Action for U.S. Appl. No. 14/383,031 dated Feb. 24, 2017; 15 pgs.

CHEMICAL CONVERSION AGENT AND METAL SURFACE TREATMENT METHOD

TECHNICAL FIELD

The present invention relates to a chemical conversion agent. More particularly, the present invention relates to a chemical conversion agent which is preferably used for a surface treatment of an aluminum-based metal material, and a metal surface treatment method using the chemical conversion agent.

BACKGROUND ART

An aluminum-based metal material has conventionally been employed as die castings, heat exchangers, food containers, members for secondary battery, and the like. It has been known that the corrosion reaction of the aluminum-based metal material proceeds due to moisture and contaminants adhered to a surface thereof, leading to the generation of white rust. Therefore, a chemical conversion treatment is applied to the surface of the aluminum-based metal material for the purpose of providing with excellent white rust resistance (hereinafter referred to as "corrosion resistance").

There have been proposed various chemical conversion agents capable of providing with excellent white rust resistance. A chemical conversion agent containing titanium complex fluoride ions, pentavalent vanadium compound ions, and zirconium complex fluoride ions are disclosed, for example, as a chemical conversion agent capable of providing a surface of aluminum or an alloy material thereof with satisfactory corrosion resistance (see Patent Document 1).

There is also disclosed, as technology capable of providing an aluminum-based metal material with excellent corrosion resistance, technology relating to a surface treatment agent including a resin compound having a specific structure, a vanadium compound, and a specific metal compound as essential components (see Patent Document 2). It is considered that this technology enables not only reduction of a vanadium compound but also significant improvement in stability of the vanadium compound, thus making it possible to maintain excellent corrosion resistance imparting effect for a long time by including a water-soluble organic compound having at least one functional group such as a hydroxyl group, a carbonyl group, or a carboxyl group, for example, ascorbic acid. It is also considered that the technology enables formation of a uniform coating film, thus making it possible to improve the level of corrosion resistance.

Regarding an aluminum-based metal material, an improvement in blackening resistance (hereinafter referred to as "moisture resistance") has recently been regarded as important, in addition to an improvement in corrosion resistance. Herein, an indicator of corrosion resistance is white rust, whereas, an indicator of moisture resistance is blackening. White rust is a corrosion phenomenon generated by a corrosion factor such as oxygen, water, and chloride ions, whereas, blackening is a corrosion phenomenon generated by the existence of oxygen, water, and heat.

Meanwhile, a surface of an aluminum-based metal material is subjected to a lamination process for the purpose of providing with a design and protecting the surface. A laminate film used in the lamination process is excellent in processability, corrosion resistance, and barrier property of contents, and the like. Unlike paint, the laminate film is preferred in view of production environment since volatilization of an organic solvent does not occur. Such lamination process is often applied to a surface of a coil- or sheet-shaped aluminum-based metal material which is used in food containers and members for secondary battery.

The laminate film used in the lamination process has a problem that the laminate film might be peeled from a surface of the aluminum-based metal material when an advanced processing process is applied or a heat treatment is applied, since the laminate film has excellent properties mentioned above but is not sufficient in adhesion with a surface of an aluminum-based metal material. Such peeling of the laminate film may be a major factor which impairs appearance of the aluminum-based metal material, leading to deterioration of corrosion resistance of the aluminum-based metal material.

Thus, there is disclosed technology in which a metal surface treatment agent including a basic zirconium compound and/or a cerium compound, a carboxyl group-containing resin, and an oxazoline group-containing acrylic resin, and including no fluorine is applied to a surface of an aluminum-based metal material prior to a lamination process to form a surface treated layer, thus improving adhesion between a surface of a metal material and a laminate film (see Patent Document 3).

There is also disclosed technology in which a chemical conversion coating film is formed on a surface of an aluminum-based metal material using a chemical conversion agent including at least one polyvalent metal selected from the group consisting of zirconium, titanium, and chromium prior to a lamination process, and then a surface treated layer is formed using a metal surface treatment agent including an oxazoline group-containing resin and a primary amino group-containing resin (see Patent Document 4). It is considered that this technology enables an improvement in adhesion between a surface of a metal material and a laminate film, and also an improvement in corrosion resistance.

Patent Document 1: Japanese Unexamined Patent Application, Publication No. 2010-261058
Patent Document 2: Japanese Unexamined Patent Application, Publication No. 2001-181860
Patent Document 3: Japanese Unexamined Patent Application, Publication No. 2009-84516
Patent Document 4: Japanese Unexamined Patent Application, Publication No. 2008-183523

DISCLOSURE OF THE INVENTION

Problems to be Solved by the Invention

Thus, there is required a further improvement in corrosion resistance and moisture resistance of the aluminum-based metal material. However, the currently available technology described in Patent Document 1 and 2 only provides a less than satisfactory corrosion resistance and moisture resistance of the aluminum-based metal material. Note that the technologies disclosed in Patent Documents 1 and 2 does not describe studies about moisture resistance, and thus shall not be considered as a technology for improving moisture resistance.

There is also required a further improvement in adhesion between a surface of the aluminum-based metal material and a laminate film. Therefore, at present, it cannot be said that a further improvement is sufficiently made by technologies of Patent Documents 3 and 4. Particularly, when the aluminum-based metal material is used as an aluminum member for secondary battery, excellent hydrofluoric acid resistance and alkali resistance are required.

The present invention has been made in view of the above circumstances, and an object thereof is to provide a chemical conversion agent capable of providing, for example, an aluminum-based metal material with excellent corrosion resistance and moisture resistance, while also providing the aluminum-based metal material with excellent adhesion with a laminate film, excellent hydrofluoric acid resistance, and excellent alkali resistance.

Means for Solving the Problems

In order to achieve the above object, the present invention provides a chemical conversion agent, including:
one, or two or more metal element(s) (A) selected from the group consisting of zirconium, titanium, and hafnium,
a vanadium element (B), and
a resin (C),
in which the resin (C) includes a polyvinyl alcohol-based resin (C1) consisting of at least one of polyvinyl alcohol and a derivative thereof,
the value of a ratio (Wa/Wb) of the mass-based total content (Wa) of the metal element (A) to the mass-based content (Wb) of the vanadium element (B) is 0.1-15, and
the value of a ratio ((Wa+Wb)/Wc1) of the mass-based total content (Wa+Wb) of the metal element (A) and the vanadium element (B) to the mass-based total content (Wc1) of the polyvinyl alcohol-based resin (C1) is 0.25-15.

Preferably, the resin (C) further includes one, or two or more metal ion-crosslinkable polymer(s) (C2), and
the value of a ratio (Wc2/(Wc1+Wc2)) of the mass-based total content (Wc2) of the metal ion-crosslinkable polymer (C2) to the mass-based total content (Wc1+Wc2) of the polyvinyl alcohol-based resin (C1) and the metal ion-crosslinkable polymer (C2) is preferably 0.4 or less.

It is preferred to include, as the metal ion-crosslinkable polymer (C2), one, or two or more polymer(s) selected from the group consisting of polyacrylic acid, phosphoric acid polymer, phosphoric acid polymer, water-soluble or water-dispersible epoxy polymer, water-soluble or water-dispersible urethane-based polymer, and polyester.

Preferably, the
concentration of the above metal element (A) in the chemical conversion agent is 50-100,000 ppm by mass, and
the concentration of the vanadium element (B) is 50-100,000 ppm by mass, and
the total concentration of the resin (C) is 50-100,000 ppm by mass, and pH is 0.5-6.5.

The average saponification degree of the above polyvinyl alcohol-based resin (C1) is preferably 80% or more.

It is preferred to further include a surfactant.
It is preferred to be used for a surface treatment of an aluminum-based metal material.

There is also provided a metal surface treatment method for treating a surface of a metal material, which includes the steps of: applying the chemical conversion agent of the present invention on the metal material, and drying the chemical conversion agent applied on the metal material.

Effects of the Invention

According to the present invention, it is possible to provide a chemical conversion agent capable of providing, for example, an aluminum-based metal material with excellent corrosion resistance and moisture resistance, while also providing the aluminum-based metal material with excellent adhesion with a laminate film, excellent hydrofluoric acid resistance and excellent alkali resistance.

Therefore, the aluminum-based metal material, to which the chemical conversion agent of the present invention is applied, can be preferably used as die castings, heat exchangers, food containers, members for secondary battery, and the like.

PREFERRED MODE FOR CARRYING OUT THE INVENTION

Below, embodiments of the present invention will be described in detail.

The chemical conversion agent of the present embodiment is a chemical conversion agent including one, or two or more metal element(s) (A) selected from the group consisting of zirconium, titanium, and hafnium; a vanadium element (B); and a resin (C), in which the resin (C) includes a polyvinyl alcohol-based resin (C1) consisting of at least one of polyvinyl alcohol and a derivative thereof; the value of a ratio (Wa/Wb) of the mass-based total content (Wa) of the metal element (A) to the mass-based content (Wb) of the vanadium element (B) is 0.1-15; and the value of a ratio ((Wa+Wb)/Wc1) of the mass-based total content (Wa+Wb) of the metal element (A) and the vanadium element (B) to the mass-based total content (Wc1) of the polyvinyl alcohol-based resin (C1) is 0.25-15.

The chemical conversion agent of the present embodiment is preferably used for a surface treatment of an aluminum-based metal material, and a chemical conversion coating film is formed on a surface thereof.

The aluminum-based metal material is often employed in applications such as members for secondary battery and heat exchangers since the aluminum-based metal material is excellent in processability, and has satisfactory corrosion resistance as compared with other metal materials. There is no particular limitation on the shape of the aluminum-based metal material, and the aluminum-based metal material is processed into desired shapes depending on applications.

As used herein, "aluminum-based metal material" means a metal material such as an aluminum alloy containing aluminum, in addition to aluminum.

The chemical conversion agent of the present embodiment is a coating type chemical conversion agent which includes one, or two or more metal element(s) (A) selected from the group consisting of zirconium, titanium, and hafnium; a vanadium element (B); and a polyvinyl alcohol-based resin (C1) consisting of at least one of polyvinyl alcohol and a derivative thereof. The coating type chemical conversion agent is used by a method of applying a chemical conversion agent on a metal surface, and drying the chemical conversion agent without washing a metal surface with water. In order to provide with corrosion resistance, a pickling step of removing an oxide film on a surface and a water washing step after the pickling step have conventionally been required before applying a chemical conversion agent on a surface of an aluminum-based metal material. However, with the chemical conversion agent of the present invention, it is possible to obtain high corrosion resistance and moisture resistance without removing an oxide film since a chemical conversion coating film has high barrier property and the chemical conversion agent is applied on a surface of an aluminum-based metal material. Use of the coating type chemical conversion agent enables elimination of the need of a pickling step and the subsequent water washing step, and also enables a reduction in the number of steps.

In the chemical conversion agent of the present embodiment, all of zirconium, titanium, hafnium, and vanadium exist as various ions such as complex ions. Therefore, as used herein, the content of each of zirconium, titanium, hafnium and vanadium means a value expressed in terms of a metal element of various ions.

The chemical conversion agent of the present embodiment contains one, or two or more compound(s) selected from the group consisting of a zirconium-based compound, a titanium-based compound, and a hafnium-based compound; a vanadium-based compound; and a polyvinyl alcohol-based resin (C1); and is prepared by dissolving in water.

Examples of the zirconium-based compound as a supply source of zirconium ions include zirconium compounds such as fluorozirconic acid and zirconium fluoride; and salts thereof of lithium, sodium, potassium, ammonium, and the like. It is also possible to use those prepared by dissolving a zirconium compound such as zirconium oxide with a fluoride such as hydrofluoric acid. It is also possible to use zirconium carbonate, zirconium nitrate, and an organic zirconium complex.

Examples of the titanium-based compound as a supply source of titanium ions include titanium compounds such as fluorotitanic acid and titanium fluoride; and salts thereof of lithium, sodium, potassium, ammonium, and the like. It is also possible to use those prepared by dissolving a titanium compound such as titanium oxide with a fluoride such as hydrofluoric acid. It is also possible to use titanium carbonate, titanium nitrate, and an organic titanium complex.

Examples of the hafnium-based compound as a supply source of hafnium ions include hafnium compounds such as fluorohafnium acid and hafnium fluoride; and salts thereof of lithium, sodium, potassium, ammonium, and the like. It is also possible to use those prepared by dissolving a hafnium compound such as hafnium oxide with a fluoride such as hydrofluoric acid.

The concentration of one, or two or more metal element(s) (A) selected from the group consisting of zirconium, titanium, and hafnium included in the chemical conversion agent of the present embodiment is preferably 50-100,000 ppm by mass, more preferably 400-12,000 ppm by mass, and still more preferably 500-5,000 ppm by mass, expressed in terms of metal element. The concentration of the metal element (A) of less than 50 ppm by mass tends to cause deterioration of corrosion resistance of the chemical conversion coating film. Meanwhile, the concentration of the metal element (A) of more than 100,000 ppm by mass tends to cause deterioration of liquid stability of the chemical conversion agent.

Vanadium ions supplied from the vanadium element (B) is a component which can improve the corrosion resistance of a chemical conversion coating film along with zirconium ions. Vanadium, which is insolubilized in nature by a reduction reaction, can effectively cover segregated substances and the vicinity thereof which may serve as an initiation point of corrosion.

Since the chemical conversion agent of the present embodiment comprises one, or two or more kinds of metal ions selected from the group consisting of zirconium ions, titanium ions and hafnium ions; and vanadium ions. Therefore, a chemical conversion coating film comprising one, or two or more metals selected from the group consisting of zirconium, titanium and hafnium; and vanadium is formed. Use of the chemical conversion agent of the present embodiment, comprising one, or two or more kinds of metal ions selected from the group consisting of zirconium ions, titanium ions and hafnium ions; and vanadium ions as active species, a denser chemical conversion coating film having a high coatability is formed on a surface of the aluminum-based metal material.

Divalent to pentavalent vanadium compounds can be used as a vanadium based compound serving as a source of vanadium ions. Specific examples thereof include metavanadinic acid, ammonium metavanadate, sodium metavanadate, vanadium pentoxide, vanadium oxytrichloride, vanadyl sulfate, vanadyl nitrate, vanadyl phosphate, vanadium oxide, vanadium dioxide, vanadium oxyacetylacetonate, vanadium oxyisopropoxide, vanadium chloride, and the like. In the present embodiment, tetravalent or pentavalent vanadium compounds are preferred, and specifically, vanadyl sulfate (tetravalent) and ammonium metavanadate (pentavalent) are preferably used.

The concentration of the vanadium element (B) included in the chemical conversion agent of the present embodiment is preferably 50-100,000 ppm by mass, more preferably 400 to 9,000 ppm by mass, and still more preferably 500 to 5000 ppm by mass, expressed in terms of the vanadium element from the viewpoint of improving corrosion resistance of the chemically converted metal material.

As mentioned above, in the chemical conversion agent of the present embodiment, the value of a ratio (Wa/Wb) of the mass-based total content (Wa) of one, or two or more metal element(s) (A) selected from the group consisting of zirconium, titanium, and hafnium to the mass-based content (Wb) of the vanadium element (B) is 0.1-15. In a case where the above (Wa/Wb) is less than 0.1, the corrosion resistance and moisture resistance is decreased. In a case where the above (Wa/Wb) is 15 or more, the corrosion resistance is decreased.

Further, the value of a ratio (Wa/Wb) of the mass-based total content (Wa) of the metal element (A) to the mass-based content (Wb) of the vanadium element (B) is preferably 0.1 to 9.5, more preferably 0.15 to 6.5 in view of that the above effect can further be enhanced.

As mentioned above, the chemical conversion agent of the present embodiment includes a resin (C). The resin (C) is a film-forming component.

The resin (C) comprises the polyvinyl alcohol based resin (C1) comprising at least one of polyvinyl alcohol and a derivative thereof. The polyvinyl alcohol based resin is typically polyvinyl alcohol (PVA) obtained by saponificating a vinyl acetate polymer. Further, derivatives of PVA, for example, those in which some of the hydroxy groups are replaced with alkyl groups such as propyl groups and butyl groups; and acetoacetyl groups can also be used as derivatives of polyvinyl alcohol. In a case where the chemical conversion agent comprises the polyvinyl alcohol based resin (C1) comprising at least one of polyvinyl alcohol and a derivative thereof, the hydroxy groups of the polyvinyl alcohol based resin (C1) are crosslinked with the one, or two or more metal elements selected from the group consisting of zirconium, titanium and hafnium; and the vanadium element (B) in the chemical conversion agent to strengthen the chemical conversion coating film, and at the same time, to fix these metals in the chemical conversion coating film to form a dense chemical conversion coating film, thereby improving the corrosion resistance of the chemical conversion coating film. The aluminum-based metal material is provided with excellent corrosion resistance and moisture resistance by formation of a dense chemical conversion coating film. Note that a PVA having a modification degree of less than 20 mol % is used as the polyvinyl alcohol based resin (C1) in a case where a derivative of PVA is used. In a case where a PVA having a modification degree of 20 mol % or more is used as the polyvinyl alcohol based resin (C1), the corrosion resistance and moisture resistance of an aluminum heat exchanger on which a chemical conversion coating film is formed tend to be decreased because the amount of hydroxy groups to be coordinated with metal ions in the chemical conversion agent is small.

Note that polyvinyl alcohol and a derivative thereof, which have an excellent film-forming property because of high crystallinity and do not have carboxyl groups and the like, do not have a strong odor generated from a resin, and do not adsorb odorants.

The average saponification degree of the polyvinyl alcohol-based resin (C1) included in the chemical conversion agent of the present embodiment is preferably 80% or more, more preferably 90% or more, and still more preferably 98% or more. In a case where the average saponification degree of the polyvinyl alcohol based resin (C1) is less than 80%, the film-forming property of a chemical conversion agent is decreased due to decreased crystallinity. Therefore, the corrosion resistance and moisture resistance of an aluminum heat exchanger on which a metal surface film is formed tend to be inferior.

Further, in the case of the average saponification degree is less than 80%, the polyvinyl alcohol based resin (C1) also tends to have a stronger acetic-acid like odor from vinyl acetate. Examples of commercially available products of polyvinyl alcohol and derivatives thereof include PVA-105 (polyvinyl alcohol, saponification degree: 98-99%, polymerization degree: 500, manufactured by KURARAY CO., LTD.), PVA-110 (polyvinyl alcohol, saponification degree: 98-99%, polymerization degree: 1,000, manufactured by KURARAY CO., LTD.) PVA-405 (polyvinyl alcohol, saponification degree: 80-83%, the polymerization degree: 500, manufactured by KURARAY CO., LTD.), GOHSEFIMER Z-200 (acetoacetyl group-modified polyvinyl alcohol, saponification degree: 99%, polymerization degree: 1,100, acetoacetyl group modification degree: 4-5 mol %, manufactured by Nippon Synthetic Chemical Industry Co., Ltd.), and the like.

The average saponification degree is the value calculated by the weighted average. For example, when polyvinyl alcohol having a saponification degree of 90% is mixed with polyvinyl alcohol having a saponification degree of 98% in a mass ratio of 6/4, the average saponification degree of the entire resin mixture is 93.2%.

The polymerization degree of the polyvinyl alcohol-based resin (C1) included in the chemical conversion agent of the present embodiment is preferably 100-5,000. In a case where polymerization degree of the polyvinyl alcohol based resin (C1) is 100 to 5,000, a robust chemical conversion coating film can be formed, and the corrosion resistance of the chemical conversion coating film can be enhanced.

As mentioned above, in the chemical conversion agent of the present embodiment, the value of a ratio ((Wa+Wb)/Wc1) of the mass-based total content (Wa+Wb) of one, or two or more metal element(s) (A) selected from the group consisting of zirconium, titanium, and hafnium, as well as a vanadium element (B) to the mass-based total content (Wc1) of a polyvinyl alcohol-based resin (C1) is 0.25-15. If the value of the ratio ((Wa+Wb)/Wc1) is less than 0.25, metal crosslinking decreases, leading to deterioration of corrosion resistance and moisture resistance. If the value of the ratio ((Wa+Wb)/Wc1) exceeds 15, a film is not sufficiently formed, leading to deterioration of moisture resistance.

Further, the value of a ratio ((Wa+Wb)/Wc1) of the mass-based total content (Wa+Wb) of the metal element (A) and the vanadium element (B) to the mass-based total content (Wc1) of the polyvinyl alcohol based resin (C1) is preferably 0.25 to 10, more preferably 0.3 to 6 in view of that the above effect is further enhanced.

The resin (C) included in the chemical conversion agent of the present embodiment may further include one, or two or more metal ion-crosslinkable polymer(s) (C2). The metal ion-cross linkable polymer (C2) is a polymer which forms a crosslink with an metal ion. Examples of the metal ion-crosslinkable polymer (C2) include polyacrylic acid, a phosphoric acid polymer, a phosphoric acid polymer, a water-soluble or water-dispersible epoxy polymer, a water-soluble or water-dispersible urethane-based polymer, a polyester, a water-soluble or water-dispersible polyolefin, and the like. The metal ion-crosslinkable polymer (C2) can form a crosslink with a metal ion of zirconium and vanadium in the chemical conversion coating film, and thus suppress the dissolution of the chemical conversion coating film, leading to improved corrosion resistance. The above resin (C) as a film-forming component preferably consists only of the polyvinyl alcohol-based resin (C1), and one, or two or more metal ion-crosslinkable polymer(s) (C2). In contrast, other than resins of polyacrylic acid and the like recited above, for example, resins of polyethylene oxide, polyethylene glycol, polyacrylic sulfone, polystyrene sulfonate and the like have a low crosslinking capability with metal ions. Therefore, in a case where a resin of other than polyacrylic acid and the like recited above (polyethylene oxide and the like) is used as a metal ion-crosslinkable polymer, the resulting chemical conversion coating film tends to dissolve, resulting in decreased corrosion resistance.

From the viewpoint of improving corrosion resistance of the metal material, the chemical conversion agent of the present embodiment preferably includes, as the metal ion-crosslinkable polymer (C2), one, or two or more polymer(s) selected from the group consisting of polyacrylic acid, a phosphoric acid polymer, a phosphoric acid polymer, a water-soluble or water-dispersible epoxy polymer, a water-soluble or water-dispersible urethane-based polymer, and a polyester. Examples of commercial products of the metal ion-crosslinkable polymer (C2) include AC10L (polyacrylic acid, Toagosei Co., Ltd.), Polyphosmer (phosphoric acid polymer, DAP Co., Ltd.) and the like.

In the chemical conversion agent of the present embodiment, the value of a ratio (Wc2/(Wc1+Wc2)) of the mass-based total content (Wc2) of the metal ion-crosslinkable polymer (C2) to the mass-based total content (Wc1+Wc2) of the polyvinyl alcohol-based resin (C1) and the metal ion-crosslinkable polymer (C2) is preferably 0.4 or less, more preferably 0.2 or less, and still more preferably 0.1 or less. If the value of the ratio (Wc2/(Wc1+Wc2)) is more than 0.4, corrosion resistance and moisture resistance of the metal material with the chemical conversion coating film formed thereon tends to deteriorate because of less hydroxyl groups in the resin.

Examples of commercial products of the metal ion-crosslinkable polymer (C2) include AC10L (polyacrylic acid, Toagosei Co., Ltd.), Polyphosmer (phosphoric acid polymer, DAP Co., Ltd.) and the like. The chemical conversion agent according to the present embodiment includes only the polyvinyl alcohol-based resin (C1) and the metal ion-crosslinkable polymer (C2), as the resin (C), whereby metal crosslinking in the chemical conversion coating film is enhanced, leading to a further improvement in corrosion resistance and moisture resistance of the metal material with the chemical conversion coating film formed thereon.

Note that the phrase that the chemical conversion agent "includes only the polyvinyl alcohol based resin (C1) and the metal ion-cross linkable polymer (C2) as the resin (C)" does not exclude a case where the chemical conversion agent includes some resins in addition to the polyvinyl alcohol based resin (C1) and the metal ion linkable polymer (C2). Specifically, the phrase "includes only the polyvinyl alcohol based resin (C1) and the metal ion-crosslinkable polymer (C2)" refers to a case where the content of resins other than the polyvinyl alcohol based resin (C1) and the metal ion-crosslinkable polymer (C2) in the chemical conversion agent is 5 mass % or less relative to the mass-based total content (Wc1+Wc2) of the polyvinyl alcohol based resin (C1) and the metal ion-crosslinkable polymer (C2).

From the viewpoint of being capable of improving corrosion resistance of the chemically converted metal material, the total concentration of the resin (C) included in the chemical conversion agent of the present embodiment is preferably 50-100,000 ppm by mass, more preferably 400-50,000 ppm by mass, and still more preferably 1,000-20,000 ppm by mass.

The chemical conversion agent of the present embodiment may contain metal ions of manganese, zinc, cerium, trivalent chromium, magnesium, strontium, calcium, tin, copper, iron, and silicon compounds; and phosphorus compounds such as phosphoric acid and condensed phosphoric acid for the purpose of improving corrosion resistance; and various silane coupling agents such as aminosilane and epoxysilane for the purpose of improving adhesion.

The chemical conversion agent of the present embodiment may also contain aluminum ions and free fluorine ions.

Examples of a supply source of aluminum ions include aluminates such as aluminum nitrate, aluminum sulfate, aluminum fluoride, aluminum oxide, alum, aluminum silicate, and sodium aluminate; and fluoroaluminum salts such as sodium fluoroaluminate.

Examples of a supply source of free fluorine ions include hydrofluoric acid and salts thereof, such as hydrofluoric acid, ammonium hydrogen fluoride, zirconium hydrofluoric acid, and titaniumhydrofluoric acid; metal fluorides such as sodium fluoride, zirconium fluoride, and titanium fluoride; and ammonium fluoride. When using zirconium fluoride and titanium fluoride, it is possible to provide the same supply source as those of zirconium ions and titanium ions.

The chemical conversion agent of the present embodiment may include a surfactant, in addition to the resin (C) as the film-forming component. The content of the surfactant in the chemical conversion agent is preferably 5% by mass or less based on the solid component in the chemical conversion agent. The chemical conversion agent includes the surfactant in the proportion within the above range, whereby, wettability tends to become satisfactory, thus making it easy to apply the chemical conversion agent. The surfactant to be included in the chemical conversion agent may be a cationic surfactant, a nonionic surfactant, or an anionic surfactant. The surfactant to be included in the chemical conversion agent is preferably a nonionic surfactant.

The pH of the chemical conversion agent is preferably 0.5-6.5, and more preferably 1-5. If the pH of the chemical conversion agent is lower than 0.5 or higher than 6.5, satisfactory chemical conversion coating film does not tend to be formed, leading to deterioration of corrosion resistance and moisture resistance of the metal material.

Use of the chemical conversion agent of the present embodiment with the above constitution enables formation of a chemical conversion coating film of the present invention. A metal surface treatment method for treating a surface of a metal material using the chemical conversion agent (hereinafter sometimes referred to as the "metal surface treatment method of the present embodiment") includes the steps of applying the above-mentioned chemical conversion agent on a metal material, and drying the chemical conversion agent applied on the metal material.

In chemical conversion of the metal material, there is no particular limitation on the method of applying the chemical conversion agent of the present embodiment on the metal material. The method may be either a spraying method or a dipping method. When the metal material has a complicated shape, a chemical conversion step is preferably performed by the dipping method. The temperature of the chemical conversion agent in the chemical conversion step is preferably 5-40° C. A chemical conversion coating film formed by the chemical conversion step which is performed under conditions satisfying these requirements has excellent corrosion resistance and moisture resistance.

In the metal surface treatment method of the present embodiment, a chemical conversion agent is applied on a surface of a metal material, and then the chemical conversion agent applied on the metal material is dried to form a chemical conversion coating film on the surface of the metal material. Drying of the chemical conversion agent applied on the metal material enables crosslinking of polyvinyl alcohol or derivatives thereof with metals such as zirconium and vanadium to thereby fix metal such as zirconium in the chemical conversion coating film. There is no particular limitation on the drying temperature and the drying time during drying of the chemical conversion agent, and the drying temperature is preferably 100-220° C., and more preferably 120-220° C. The drying time is preferably 1-120 minutes. The drying temperature of lower than 100° C. is likely to cause insufficient film-forming property, while the drying temperature of higher than 220° C. tends to cause decomposition of the resin, leading to formation of a brittle film.

In the metal surface treatment method of the present embodiment, either the below-mentioned step of laminating a laminate film or a step of applying an adhesive, an adherence agent, a coating material, or the like may be performed before a step of drying the chemical conversion agent.

In the metal surface treatment method of the present embodiment, there is no need to remove an oxide film on a surface of an aluminum-based metal material. In the metal surface treatment method of the present embodiment, if the above-mentioned chemical conversion agent is applied on a surface of the aluminum-based metal material, a chemical conversion coating film capable of exhibiting barrier property, corrosion resistance and moisture resistance can be obtained without removing the oxide film. Therefore, in the metal surface treatment method of the present embodiment, there is no need to provide a pickling step and the subsequent water washing step, so that the number of steps can be reduced.

The amount of the solid component of the chemical conversion coating film to be formed by the metal surface treatment method of the present embodiment is preferably 5-3,000 $mg/m^2$, and more preferably 30-1,000 $mg/m^2$. By satisfying these requirements, the metal material can be provided with more excellent corrosion resistance and moisture resistance. As mentioned above, since the chemical conversion agent of the present embodiment is a coating type chemical conversion agent, the amount of the solid component of chemical conversion agent applied on the surface of the metal material becomes the amount of the solid component of the chemical conversion coating film.

The above-described chemical conversion agent and chemical conversion coating film of the present embodiment are preferably used for a surface treatment of a member for secondary battery made of an aluminum-based metal material. A battery packaging material and electrodes are included as members for secondary battery. In this case, first, a chemical conversion coating film is formed on a surface of an aluminum-based metal material using the chemical conversion agent of the present embodiment, and then an adhesion treating agent is applied to form an adhesion treating layer. Then, laminate films are laminated to obtain an aluminum member for secondary battery.

As mentioned above, a laminate film may be laminated before applying a chemical conversion agent of the present embodiment on a surface of an aluminum-based metal material and drying the chemical conversion agent. In this case, the chemical conversion agent is dried after laminating the laminate film.

The battery packaging material is preferably, for example, a lithium ion battery packaging material. Especially in a lithium ion battery packaging material for automobile, from the viewpoint of safety, high-level fluorinated acid resistance and high-level alkali resistance are required, in addition to high-level laminate adhesion (adhesion between a surface of a metal material and a laminate film). The reason is as follows.

In the lithium ion battery, those prepared by dissolving an electrolyte in aprotic solvents such as propylene carbonate and ethylene carbonate are usually used as an electrolytic solution. From the viewpoint of a stable operation of a battery, alkali lithium salts such as $LiPF_6$ and $LiBF_4$ are used as the electrolyte. Therefore, high alkali resistance is required for a lithium ion battery packaging material. These lithium salts are hydrolyzed to generate hydrofluoric acid having strong corrosiveness. Therefore, the lithium ion battery packaging material is required to have high fluorinated acid resistance.

In this regard, according to a battery packaging material obtained by forming a chemical conversion coating film by the chemical conversion agent of the present embodiment, followed by a lamination process via an adhesion treating layer, excellent adhesion with a laminate film, excellent fluorinated acid resistance, and excellent alkali resistance are obtained, in addition to the above-mentioned excellent corrosion resistance and excellent moisture resistance. These effect are more enhanced by controlling the value of a ratio (Wa/Wb) of the mass-based total content (Wa) of a metal element (A) to the mass-based content (Wb) of a vanadium element (B) within the above-mentioned range, and controlling the value of a ratio value ((Wa+Wb)/Wc1) of the mass-based total content (Wa+Wb) of a metal element (A) and a vanadium element (B) to the mass-based total content (Wc1) of a polyvinyl alcohol-based resin (C1) within the above-mentioned range. Accordingly, the chemical conversion agent of the present embodiment is preferably used for a surface treatment of a lithium ion battery packaging material.

A conventionally known adhesion treating agent is used as the adhesion treating agent. For example, those which include an oxazoline group-containing resin and a primary amino group-containing resin and, if necessary, at least one selected from the group consisting of a glycidyl group-containing resin, a phenolic hydroxyl group-containing resin, a carboxyl group-containing resin, and a block isocyanate group-containing resin can be used.

An oxazoline group-containing resin including an acrylic skeleton as a main chain is preferably used as the oxazoline group-containing resin from the viewpoint of excellent stability in a water solvent, and colorless and transparent appearance after coating. For example, "EPOCROS WS700" (trade name, manufactured by Nippon Shokubai Co., Ltd.) is used as the oxazoline group-containing resin including an acrylic skeleton as a main chain.

The content of the oxazoline group-containing resin in the adhesion treating agent is preferably 10%-90% by mass based on the resin solid component. The content within the above range enables more excellent adhesion with a laminate film. More preferably, the content is 20%-60% by mass.

For example, polyallylamine, polylysine, and polyvinylamine are used as the primary amino group-containing resin. Of these, polyallylamine is preferably used from the viewpoint of high reactivity with a polyvalent metal in a chemical conversion coating film, and excellent adhesion. For example, "PAA-15C" (manufactured by Nittobo Medical Co., Ltd.) is used as polyallylamine.

The content of the primary amino group-containing resin in the adhesion treating agent is preferably 10% by mass-90% by mass based on the resin solid component. The content within the above range enables more excellent adhesion with a laminate film. More preferably, the content is 20%-60% by mass.

The glycidyl group-containing resin, the phenolic hydroxyl group-containing resin, the carboxyl group-containing resin, and the block isocyanate group-containing resin is crosslinked with an oxazoline group of the oxazoline group-containing resin and an amino group of the primary amino group-containing resin by heating when forming an adhesion treating layer. This is preferred since a stable three-dimensional network is formed.

The adhesion treating agent is applied on a surface of an aluminum-based metal material, on which a chemical conversion coating film is formed, by a conventionally known technique. Specifically, the adhesion treating agent is applied by a roll coating method, a bar coating method, a spray treatment method, a dip treatment method, and the like. After application, the adhesion treating agent is dried by heating at 40° C.-160° C. for 2-60 seconds to form an adhesion treating layer.

The amount of a dry coating film expressed in terms of whole organic carbon of the adhesion treating layer is preferably 5 $mg/m^2$-1,000 $mg/m^2$. The amount within the above range enables more excellent adhesion with a laminate film, and more excellent fluorinated acid resistance and more excellent alkali resistance.

A resin film is used as a laminate film. As the resin film, for example, thermoplastic resins such as polyethylene terephthalate (PET), polyethylene naphthalate (PEN), polypropylene (PP), polycarbonate (PC), triacetyl cellulose (TAC), polyvinyl chloride (PVC), polyester, polyolefine, polyphenylene sulfide (PPS), and acryl can be used.

Examples of the lamination processing method of laminating a laminate film include, but are not particularly limited to, a dry lamination method, an extrusion lamination method, and the like.

The present invention is not limited to the embodiments mentioned above, and modifications and improvements are included in the present invention as long as the object of the present invention can be achieved.

EXAMPLES

The present invention will be described in more detail by way of Examples, but the present invention is not limited thereto. Part(s), percentage(s), and ppm(s) are by mass unless otherwise specified.

Pure water, a zirconium-based compound (or a titanium-based compound), a vanadium-based compound, a resin, and a surfactant were mixed so that the mass-based content of each of a metal element (A), a vanadium element (B), a resin (C1), and a resin (C2) become the numerical values as shown in Tables 1-3 to prepare chemical conversion agents of Examples and Comparative Examples. The pH of each chemical conversion agent was adjusted within a range shown in Tables 1-6 using an 25% aqueous ammonia solution or 67.5% nitric acid. Types of zirconium-based compounds, vanadium-based compounds, resins, and surfactants shown in Tables 1-6 are listed below.

Compound serving as Supply Source of Metal Element (A)
- (a) Zirconium ammonium fluoride
- (b) Zirconium acetate
- (c) Tetra-n-propoxyzirconium
- (d) Titanium ammonium fluoride Supply Source of Vanadium-Based Compound (Vanadium Element (B))
- (a) Vanadyl sulfate
- (b) Ammonium metavanadate
- (c) Triisopropoxy oxovanadium Resin (C1)
- (a) PVA-110 (polyvinyl alcohol, saponification degree: 98-99%, polymerization degree: 1,000, manufactured by KURARAY CO., LTD.)
- (b) PVA-105 (polyvinyl alcohol, saponification degree: 98-99%, polymerization degree: 500, manufactured by KURARAY CO., LTD.)
- (c) PVA-405 (polyvinyl alcohol, saponification degree: 80-83%, polymerization degree: 500, manufactured by KURARAY CO., LTD.)
- (f) GOHSEFIMER Z-200 (acetoacetyl group-modified vinyl alcohol, saponification degree: 99%, polymerization degree: 1,100, acetoacetyl group modification degree: 4-5 mol %, manufactured by Nippon Synthetic Chemical Industry Co., Ltd.)
- (h) PVA-505 (polyvinyl alcohol, saponification degree: 72.5-74.5%, polymerization degree: 500, manufactured by KURARAY CO., LTD.)

Resin (C2)
- (d) JURYMER AC10L (polyacrylic acid, manufactured by Nihonjunyaku Co.)
- (e) Poly-Nass PS-1 (polystyrenesulfonic acid, manufactured by Tosoh Organic Chemical Co., Ltd.)
- (g) PEO-1 (polyethylene glycol, manufactured by SUMITOMO SEIKA CHEMICALS CO., LTD.)
- (i) Polyvinylsulfonic acid (polyvinylsulfonic acid, manufactured by Sigma-Aldrich)
- (j) PAA-15C (polyallylamine, manufactured by NITTOBO MEDICAL CO., LTD.)

Surfactant
- (a) Sodium lauryl sulfate (anionic surfactant, manufactured by Wako Pure Chemical Industries, Ltd.)
- (b) EMULGEN LS-110 (nonionic surfactant, manufactured by Kao Corporation)

[Fabrication of Specimens]

A chemical conversion treatment was carried out by dipping aluminum material pieces (manufactured by Nippon Testpanel Co., Ltd., material: A1100P, size: 0.8×70×150 mm) in the thus obtained respective chemical conversion agents at 25° C. for 15 seconds. Here, the amount of adhered chemical conversion agent was adjusted so that the amount of the solid component in the chemical conversion coating film becomes 0.2 g/m$^2$.

The aluminum material pieces with a chemical conversion agent film formed on a surface were dried under the conditions at 150° C. for 30 minutes. As a result of drying, a chemical conversion coating film was formed on a surface of the aluminum material pieces. The aluminum material pieces was air-cooled at room temperature (25° C.) for 30 minutes to obtain specimens of the respective Examples and Comparative Examples.

[Evaluation of Corrosion Resistance (SST Test)]

The thus obtained specimens were left to stand for 240 hours while leaning against a salt water spraying device, taken out, washed with pure water and then dried in a drying furnace at 80° C. for 10 minutes. The area where white rust occurs was visually evaluated according to the below-mentioned evaluation criteria. Corrosion resistance was evaluated by two evaluators based on an average of the evaluation results of two evaluators. The evaluation results are shown in Tables 1-3. As a result of the SST test, score of 7 or more corresponds to a passing grade of corrosion resistance.

(Evaluation Criteria)
- 10: No white rust occurs.
- 9: Area where white rust occurs is less than 10%.
- 8: Area where white rust occurs is 10% or more and less than 20%.
- 7: Area where white rust occurs is 20% or more and less than 30%.
- 6: Area where white rust occurs is 30% or more and less than 40%.
- 5: Area where white rust occurs is 40% or more and less than 50%.
- 4: Area where white rust occurs is 50% or more and less than 60%.
- 3: Area where white rust occurs is 60% or more and less than 70%.
- 2: Area where white rust occurs is 70% or more and less than 80%.
- 1: Area where white rust occurs is 80% or more and less than 90%.
- 0: Area where white rust occurs is 90% or more.

[Evaluation of Moisture Resistance]

With regard to the specimens obtained in the respective Examples and Comparative Examples, a humidity test was carried out under atmosphere at a temperature of 70° C. and a relative humidity of 98% or more for 500 hours. After the test, area where rust occurs was visually evaluated according to the following evaluation criteria. Moisture resistance was evaluated by two evaluators based on an average of the evaluation results of two evaluators. Since blackening has property that it finally changes into white rust, the area where rust occurs was calculated as the total of the area where blackening occurs and the area where white rust occurs. The evaluation results are shown in Tables 1-3. As a result of the moisture resistance test, score of 7 or more corresponds to a passing grade of moisture resistance.

(Evaluation Criteria)
- 10: No rust occurs.
- 9: Area where rust occurs is less than 10%.
- 8: Area where rust occurs is 10% or more and less than 20%.
- 7: Area where rust occurs is 20% or more and less than 30%.
- 6: Area where rust occurs is 30% or more and less than 40%.
- 5: Area where rust occurs is 40% or more and less than 50%.
- 4: Area where rust occurs is 50% or more and less than 60%.

3: Area where rust occurs is 60% or more and less than 70%.

2: Area where rust occurs is 70% or more and less than 80%.

1: Area where rust occurs is 80% or more and less than 90%.

0: Area where rust occurs is 90% or more.

[Preparation of Adhesion Treating Agent]

Using EPOCROS WS-700 (manufactured by Nippon Shokubai Co., Ltd.) and PAA-15C (manufactured by Nittobo Medical Co., Ltd.), an adhesion treating agent was prepared so that a solid component mass ratio becomes 1:1 and a solid component concentration becomes 3% by mass. A numerical value with regard to EPOCROS WS-700 and PAA-15C in Tables 4-6 is a solid component mass ratio of EPOCROS WS-700 and PAA-15C.

[Fabrication of Aluminum Member Specimens for Secondary Battery]

A chemical conversion treatment was carried out by dipping aluminum material pieces (manufactured by Nippon Testpanel Co., Ltd., material: A3003P, size: 0.8×70×150 mm) in the thus obtained respective chemical conversion agents, in the respective Examples and Comparative Examples, at 50° C. for 60 seconds, and then the above-mentioned adhesion treating agent was applied. Then, aluminum member specimens for secondary battery of the respective Examples and Comparative Examples were fabricated by thermally bonding at 240° C. for 15 seconds under a pressure of 0.4 MPa in a state where a film (PP or PET) is interposed between two aluminum material pieces.

[Laminate Adhesion]

With regard to the aluminum member specimens for secondary battery fabricated in the respective Examples and Comparative Examples, peel strength was measured using a load cell "LTS-200N-S100" (manufactured by Minebea Co., Ltd.). A peeling rate during the measurement of the peel strength was set at 20 mm/min. Specimens where the tensile strength is 30 N/5 mm or more were rated "pass (P)", while specimens where the tensile strength is less than 30 N/5 mm were rated "fail (F)". The results are shown in Table 4 to Table 6.

[Hydrofluoric Acid Resistance]

The aluminum member specimens for secondary battery fabricated in the respective Examples and Comparative Examples were dipped in an aqueous 1,000 ppm hydrofluoric acid solution (hydrofluoric acid) at 80° C. for 2 weeks. A state of peeling of the film of the results were visually evaluated by the following three-grade criteria. The results are shown in Tables 4-6.

A: 90% or more of a film remained.

B: 70% or more and less than 90% of a film remained.

C: Less than 70% of a film remained.

[Alkali Resistance]

The aluminum member specimens for secondary battery fabricated in the respective Examples and Comparative Examples were dipped in an aqueous 0.5% LiOH solution at 40° C. for 10 seconds. A state of peeling and a state of whitening of a surface of the film of the results were visually evaluated by the following three-grade criteria. The results are shown in Tables 4-6.

A: Surface whitening was not observed, and 80% of more a film remained.

B: Surface whitening was observed, and 80% of more a film remained.

C: Surface whitening was observed, and less than 80% of more a film remained.

TABLE 1

| | | | Example | | | | | | | | | |
|---|---|---|---|---|---|---|---|---|---|---|---|---|
| | | | 1 | 2 | 3 | 4 | 5 | 6 | 7 | 8 | 9 | 10 |
| Chemical conversion treatment agent | Metal element (A) | Concentration (ppm) | 2000 | 2000 | 2000 | 2000 | 400 | 2865 | 4500 | 4500 | 10000 | 4000 |
| | | Type | a | d | b | c | a | a | a | a | a | a |
| | Vanadium (B) | Concentration (ppm) | 1500 | 1500 | 1500 | 1500 | 2300 | 699 | 681 | 480 | 681 | 3200 |
| | | Type | a | a | a | a | a | b | b | c | a | a |
| | Resin (C1) | Concentration (ppm) | 4000 | 4000 | 4000 | 4000 | 5000 | 4100 | 5000 | 5000 | 10000 | 500 |
| | | Type | a | a | a | a | b | c | a | a | b | b |
| | Resin (C2) | Concentration (ppm) | — | — | — | — | — | — | — | — | — | — |
| | | Type | — | — | — | — | — | — | — | — | — | — |
| | Surfactant | Concentration (ppm) | — | — | — | — | — | — | — | — | — | — |
| | | Type | — | — | — | — | — | — | — | — | — | — |
| | | Wa/Wb | 1.33 | 1.33 | 1.33 | 1.33 | 0.17 | 4.10 | 6.61 | 9.38 | 14.68 | 1.25 |
| | | (Wa + Wb)/Wc | 0.88 | 0.88 | 0.88 | 0.88 | 0.54 | 0.87 | 1.04 | 1.00 | 1.07 | 14.40 |
| | | Wc2/(Wc1 + Wc2) | 0 | 0 | 0 | 0 | 0 | 0 | 0 | 0 | 0 | 0 |
| | | pH | 2.5 | 2.5 | 2.5 | 2.5 | 2.5 | 2.5 | 5 | 6.5 | 2.5 | 2.5 |
| Evaluation results | SST | | 10 | 9 | 9 | 9 | 9 | 10 | 10 | 10 | 10 | 10 |
| | Moisture resistance test | | 10 | 9 | 9 | 9 | 10 | 9 | 9 | 8 | 7 | 7 |

| | | | Example | | | | | | | | | |
|---|---|---|---|---|---|---|---|---|---|---|---|---|
| | | | 11 | 12 | 13 | 14 | 15 | 16 | 17 | 18 | 19 | 20 |
| Chemical conversion treatment agent | Metal element (A) | Concentration (ppm) | 3725 | 1000 | 930 | 180 | 494 | 663 | 930 | 2000 | 2000 | 2000 |
| | | Type | a | a | a | a | a | a | a | a | a | a |
| | Vanadium (B) | Concentration (ppm) | 2726 | 800 | 681 | 120 | 362 | 484 | 681 | 1500 | 1500 | 1500 |
| | | Type | a | a | a | a | a | a | a | a | a | a |
| | Resin (C1) | Concentration (ppm) | 1200 | 5000 | 6000 | 625 | 1625 | 1325 | 500 | 4000 | 4000 | 4000 |
| | | Type | c | a | a | a | a | a | a | c | a | f |
| | Resin (C2) | Concentration (ppm) | — | — | — | — | — | — | — | — | — | — |
| | | Type | — | — | — | — | — | — | — | — | — | — |
| | Surfactant | Concentration (ppm) | — | — | — | — | — | — | — | — | — | — |
| | | Type | — | — | — | — | — | — | — | — | — | — |
| | | Wa/Wb | 1.37 | 1.25 | 1.37 | 1.50 | 1.37 | 1.37 | 1.37 | 1.33 | 1.33 | 1.33 |

TABLE 1-continued

|  |  |  |  |  |  |  |  |  |  |  |
|---|---|---|---|---|---|---|---|---|---|---|
|  | (Wa + Wb)/Wc | 5.38 | 0.36 | 0.27 | 0.48 | 0.53 | 0.87 | 3.22 | 0.88 | 0.88 | 0.88 |
|  | Wc2/(Wc1 + Wc2) | 0 | 0 | 0 | 0 | 0 | 0 | 0 | 0 | 0 | 0 |
|  | pH | 1.5 | 2.5 | 3 | 3 | 3 | 3 | 3 | 3 | 7.5 | 3 |
| Evaluation results | SST | 8 | 9 | 9 | 8 | 9 | 10 | 10 | 9 | 7 | 9 |
|  | Moisture resistance test | 8 | 9 | 8 | 9 | 9 | 10 | 10 | 7 | 7 | 9 |

TABLE 2

|  |  |  | Example | | | | | | | |
|---|---|---|---|---|---|---|---|---|---|---|
|  |  |  | 21 | 22 | 23 | 24 | 25 | 26 | 27 | 28 |
| Chemical conversion treatment agent | Metal element (A) | Concentration(ppm) | 2000 | 2000 | 663 | 2000 | 2000 | 663 | 2000 | 2000 |
|  |  | Type | a | a | a | a | a | a | a | a |
|  | Vanadium (B) | Concentration (ppm) | 1500 | 1500 | 484 | 1500 | 1500 | 484 | 1500 | 1500 |
|  |  | Type | a | a | a | a | a | a | a | a |
|  | Resin (C1) | Concentration (ppm) | 3600 | 3600 | 3600 | 3200 | 3200 | 3200 | 2400 | 2400 |
|  |  | Type | a | a | a | a | a | a | a | a |
|  | Resin (C2) | Concentration (ppm) | 400 | 400 | 400 | 800 | 800 | 800 | 1600 | 1600 |
|  |  | Type | d | i | j | d | i | j | d | i |
|  | Surfactant | Concentration (ppm) | — | — | — | — | — | — | — | — |
|  |  | Type | — | — | — | — | — | — | — | — |
|  |  | Wa/Wb | 1.33 | 1.33 | 1.33 | 1.33 | 1.33 | 1.33 | 1.33 | 1.33 |
|  |  | (Wa + Wb)/Wc | 0.97 | 0.97 | 0.32 | 1.09 | 1.09 | 0.36 | 1.46 | 1.46 |
|  |  | Wc2/(Wc1 + Wc2) | 0.10 | 0.10 | 0.10 | 0.20 | 0.20 | 0.20 | 0.40 | 0.40 |
|  |  | pH | 3 | 3 | 3 | 3 | 3 | 3 | 3 | 3 |
| Evaluation results | SST |  | 10 | 10 | 10 | 8 | 9 | 9 | 7 | 7 |
|  | Moisture resistance test |  | 10 | 10 | 10 | 8 | 9 | 9 | 7 | 7 |

|  |  |  | Example | | | | | | |
|---|---|---|---|---|---|---|---|---|---|
|  |  |  | 29 | 30 | 31 | 32 | 33 | 34 | 35 |
| Chemical conversion treatment agent | Metal element (A) | Concentration(ppm) | 663 | 2000 | 2000 | 2000 | 4500 | 4500 | 2000 |
|  |  | Type | a | a | a | a | a | a | b |
|  | Vanadium (B) | Concentration (ppm) | 484 | 1500 | 1500 | 1500 | 3200 | 3200 | 1500 |
|  |  | Type | a | a | b | a | a | a | b |
|  | Resin (C1) | Concentration (ppm) | 2400 | 3600 | 3600 | 4000 | 10000 | 10000 | 4000 |
|  |  | Type | a | a | a | h | a | a | h |
|  | Resin (C2) | Concentration (ppm) | 1600 | 400 | 400 | — | — | — | — |
|  |  | Type | j | e | g | — | — | — | — |
|  | Surfactant | Concentration (ppm) | — | — | — | — | 350 | 350 | — |
|  |  | Type | — | — | — | — | a | b | — |
|  |  | Wa/Wb | 1.33 | 1.33 | 1.33 | 1.33 | 1.33 | 1.33 | 1.33 |
|  |  | (Wa + Wb)/Wc | 0.48 | 0.97 | 0.97 | 0.88 | 0.77 | 0.77 | 0.88 |
|  |  | Wc2/(Wc1 + Wc2) | 0.40 | 0.10 | 0.10 | 0 | 0 | 0 | 0 |
|  |  | pH | 3 | 3 | 3 | 2.5 | 3 | 3 | 3 |
| Evaluation results | SST |  | 7 | 7 | 7 | 7 | 10 | 10 | 7 |
|  | Moisture resistance test |  | 7 | 7 | 7 | 7 | 10 | 10 | 7 |

TABLE 3

|  |  |  | Comparative Example | | | | | | | | | |
|---|---|---|---|---|---|---|---|---|---|---|---|---|
|  |  |  | 1 | 2 | 3 | 4 | 5 | 6 | 7 | 8 | 9 | 10 |
| Chemical conversion treatment agent | Metal element (A) | Concentration (ppm) | 260 | — | 300 | 300 | 2000 | 3300 | 2000 | 3500 | — | 2000 |
|  |  | Type | a | — | a | b | a | a | a | a | — | a |
|  | Vanadium (B) | Concentration (ppm) | 3240 | 3500 | 220 | 220 | 1500 | 200 | 1500 | — | — | 1500 |
|  |  | Type | a | a | a | a | a | a | a | — | — | a |
|  | Resin (C1) | Concentration (ppm) | 4000 | 4000 | 4000 | 4000 | — | 4000 | 210 | 4000 | 4000 | — |
|  |  | Type | a | a | a | a | — | a | a | b | a | — |
|  | Resin (C2) | Concentration (ppm) | — | — | — | — | — | — | — | — | — | 4000 |
|  |  | Type | — | — | — | — | — | — | — | — | — | d |
|  | Surfactant | Concentration (ppm) | — | — | — | — | — | — | — | — | — | — |
|  |  | Type | — | — | — | — | — | — | — | — | — | — |
|  |  | Wa/Wb | 0.08 | — | 1.36 | 1.25 | 1.33 | 16.50 | 1.33 | — | — | 1.33 |
|  |  | (Wa + Wb)/Wc | 0.88 | 0.88 | 0.13 | 0.13 | — | 0.88 | 16.67 | 0.88 | — | 0.88 |

TABLE 3-continued

|  |  | Comparative Example | | | | | | | | | |
|---|---|---|---|---|---|---|---|---|---|---|---|
|  |  | 1 | 2 | 3 | 4 | 5 | 6 | 7 | 8 | 9 | 10 |
|  | Wc2/(Wc1 + Wc2) | 0 | 0 | 0 | 0 | 0 | 0 | 0 | 0 | 0 | 1 |
|  | pH | 2.5 | 2.5 | 3 | 3 | 2.5 | 2.5 | 2.5 | 3 | 3 | 2.5 |
| Evaluation results | SST | 6 | 5 | 4 | 3 | 8 | 6 | 8 | 5 | 1 | 5 |
|  | Moisture resistance test | 6 | 6 | 6 | 4 | 6 | 4 | 6 | 5 | 3 | 6 |

TABLE 4

|  |  |  |  | Example | | | | | | | | | |
|---|---|---|---|---|---|---|---|---|---|---|---|---|---|
|  |  |  |  | 1 | 2 | 3 | 4 | 5 | 6 | 7 | 8 | 9 | 10 |
| Chemical conversion treatment agent | Metal element (A) | Concentration (ppm) | | 2000 | 2000 | 2000 | 2000 | 400 | 2865 | 4500 | 4500 | 10000 | 4000 |
|  |  | Type | | a | d | b | c | a | a | a | a | a | a |
|  | Vanadium (B) | Concentration (ppm) | | 1500 | 1500 | 1500 | 1500 | 2300 | 699 | 681 | 480 | 681 | 3200 |
|  |  | Type | | a | a | a | a | a | b | b | c | a | a |
|  | Resin (C1) | Concentration (ppm) | | 4000 | 4000 | 4000 | 4000 | 5000 | 4100 | 5000 | 5000 | 10000 | 500 |
|  |  | Type | | a | a | a | a | b | c | a | a | b | b |
|  | Resin (C2) | Concentration (ppm) | | — | — | — | — | — | — | — | — | — | — |
|  |  | Type | | — | — | — | — | — | — | — | — | — | — |
|  | Surfactant | Concentration (ppm) | | — | — | — | — | — | — | — | — | — | — |
|  |  | Type | | — | — | — | — | — | — | — | — | — | — |
|  |  | Wa/Wb | | 1.33 | 1.33 | 1.33 | 1.33 | 0.17 | 4.10 | 6.61 | 9.38 | 14.68 | 1.25 |
|  |  | (Wa + Wb)/Wc | | 0.88 | 0.88 | 0.88 | 0.88 | 0.54 | 0.87 | 1.04 | 1.00 | 1.07 | 14.40 |
|  |  | Wc2/(Wc1 + Wc2) | | 0 | 0 | 0 | 0 | 0 | 0 | 0 | 0 | 0 | 0 |
|  |  | pH | | 2.5 | 2.5 | 2.5 | 2.5 | 2.5 | 2.5 | 5 | 6.5 | 2.5 | 2.5 |
| Adhesion treating agent | EPOCROS WS-700 | | | 1 | 1 | 1 | 1 | 1 | 1 | 1 | 1 | 1 | 1 |
|  | PAA15-C | | | 1 | 1 | 1 | 1 | 1 | 1 | 1 | 1 | 1 | 1 |
| Laminate film | | | | PP | PP | PP | PP | PP | PET | PP | PP | PP | PP |
| Evaluation results | Laminate adhesion | | | P | P | P | P | P | P | P | P | P | P |
|  | Hydrofluoric acid resistance | | | A | A | A | A | A | A | A | A | A | A |
|  | Alkali resistance | | | A | A | A | A | A | A | A | A | A | A |

|  |  |  |  | Example | | | | | | | | | |
|---|---|---|---|---|---|---|---|---|---|---|---|---|---|
|  |  |  |  | 11 | 12 | 13 | 14 | 15 | 16 | 17 | 18 | 19 | 20 |
| Chemical conversion treatment agent | Metal element (A) | Concentration (ppm) | | 3725 | 1000 | 930 | 180 | 494 | 663 | 930 | 2000 | 2000 | 2000 |
|  |  | Type | | a | a | a | a | a | a | a | a | b | a |
|  | Vanadium (B) | Concentration (ppm) | | 2726 | 800 | 681 | 120 | 362 | 484 | 681 | 1500 | 1500 | 1500 |
|  |  | Type | | a | a | a | a | a | a | a | a | b | a |
|  | Resin (C1) | Concentration (ppm) | | 1200 | 5000 | 6000 | 625 | 1625 | 1325 | 500 | 4000 | 4000 | 4000 |
|  |  | Type | | c | a | a | a | a | a | a | c | a | f |
|  | Resin (C2) | Concentration (ppm) | | — | — | — | — | — | — | — | — | — | — |
|  |  | Type | | — | — | — | — | — | — | — | — | — | — |
|  | Surfactant | Concentration (ppm) | | — | — | — | — | — | — | — | — | — | — |
|  |  | Type | | — | — | — | — | — | — | — | — | — | — |
|  |  | Wa/Wb | | 1.37 | 1.25 | 1.37 | 1.50 | 1.37 | 1.37 | 1.37 | 1.33 | 1.33 | 1.33 |
|  |  | (Wa + Wb)/Wc | | 5.38 | 0.36 | 0.27 | 0.48 | 0.53 | 0.87 | 3.22 | 0.88 | 0.88 | 0.88 |
|  |  | Wc2/(Wc1 + Wc2) | | 0 | 0 | 0 | 0 | 0 | 0 | 0 | 0 | 0 | 0 |
|  |  | pH | | 1.5 | 2.5 | 3 | 3 | 3 | 3 | 3 | 3 | 7.5 | 3 |
| Adhesion treating agent | EPOCROS WS-700 | | | 1 | 1 | 1 | 1 | 1 | 1 | 1 | 1 | 1 | 1 |
|  | PAA15-C | | | 1 | 1 | 1 | 1 | 1 | 1 | 1 | 1 | 1 | 1 |
| Laminate film | | | | PP | PP | PP | PP | PP | PP | PP | PP | PP | PP |
| Evaluation results | Laminate adhesion | | | P | P | P | P | P | P | P | P | P | P |
|  | Hydrofluoric acid resistance | | | A | A | A | A | A | A | A | A | B | A |
|  | Alkali resistance | | | A | A | A | A | A | A | A | A | B | A |

TABLE 5

|  |  |  | Example | | | | | | | |
|---|---|---|---|---|---|---|---|---|---|---|
|  |  |  | 21 | 22 | 23 | 24 | 25 | 26 | 27 | 28 |
| Chemical conversion treatment agent | Metal element (A) | Concentration (ppm) | 2000 | 2000 | 663 | 2000 | 2000 | 663 | 2000 | 2000 |
|  |  | Type | a | a | a | a | a | a | a | a |
|  | Vanadium (B) | Concentration (ppm) | 1500 | 1500 | 484 | 1500 | 1500 | 484 | 1500 | 1500 |
|  |  | Type | a | a | a | a | a | a | a | a |
|  | Resin (C1) | Concentration (ppm) | 3600 | 3600 | 3600 | 3200 | 3200 | 3200 | 2400 | 2400 |
|  |  | Type | a | a | a | a | a | a | a | a |
|  | Resin (C2) | Concentration (ppm) | 400 | 400 | 400 | 800 | 800 | 800 | 1600 | 1600 |
|  |  | Type | d | i | j | d | i | j | d | i |
|  | Surfactant | Concentration (ppm) | — | — | — | — | — | — | — | — |
|  |  | Type | — | — | — | — | — | — | — | — |
|  |  | $W_a/W_b$ | 1.33 | 1.33 | 1.33 | 1.33 | 1.33 | 1.33 | 1.33 | 1.33 |
|  |  | $(W_a + W_b)/W_c$ | 0.97 | 0.97 | 0.32 | 1.09 | 1.09 | 0.36 | 1.46 | 1.46 |
|  |  | $W_{c2}/(W_{c1} + W_{c2})$ | 0.10 | 0.10 | 0.10 | 0.20 | 0.20 | 0.20 | 0.40 | 0.40 |
|  |  | pH | 3 | 3 | 3 | 3 | 3 | 3 | 3 | 3 |
| Adhesion treating agent | EPOCROS WS-700 | | 1 | 1 | 1 | 1 | 1 | 1 | 1 | 1 |
|  | PAA15-C | | 1 | 1 | 1 | 1 | 1 | 1 | 1 | 1 |
| Laminate film |  |  | PP | PP | PP | PP | PP | PP | PP | PP |
| Evaluation results | Laminate adhesion |  | P | P | P | P | P | P | P | P |
|  | Hydrofluoric acid resistance |  | A | A | A | A | A | A | B | B |
|  | Alkali resistance |  | A | A | A | A | A | A | B | B |

|  |  |  | Example | | | | | | |
|---|---|---|---|---|---|---|---|---|---|
|  |  |  | 29 | 30 | 31 | 32 | 33 | 34 | 35 |
| Chemical conversion treatment agent | Metal element (A) | Concentration (ppm) | 663 | 500 | 2000 | 2000 | 4500 | 4500 | 2000 |
|  |  | Type | a | a | a | a | a | a | b |
|  | Vanadium (B) | Concentration (ppm) | 484 | 500 | 1500 | 1500 | 3200 | 3200 | 1500 |
|  |  | Type | a | a | b | a | a | a | b |
|  | Resin (C1) | Concentration (ppm) | 2400 | 3600 | 3600 | 4000 | 10000 | 10000 | 4000 |
|  |  | Type | a | a | a | h | a | a | h |
|  | Resin (C2) | Concentration (ppm) | 1600 | 400 | 400 | — | — | — | — |
|  |  | Type | j | e | g | — | — | — | — |
|  | Surfactant | Concentration (ppm) | — | — | — | — | 350 | 350 | — |
|  |  | Type | — | — | — | — | a | b | — |
|  |  | $W_a/W_b$ | 1.33 | 1.00 | 1.33 | 1.33 | 1.33 | 1.33 | 1.33 |
|  |  | $(W_a + W_b)/W_c$ | 0.48 | 0.28 | 1.09 | 0.88 | 0.77 | 0.77 | 0.88 |
|  |  | $W_{c2}/(W_{c1} + W_{c2})$ | 0.40 | 0.10 | 0.10 | 0 | 0 | 0 | 0 |
|  |  | pH | 3 | 3 | 3 | 2.5 | 3 | 3 | 3 |
| Adhesion treating agent | EPOCROS WS-700 | | 1 | 1 | 1 | 1 | 1 | 1 | 1 |
|  | PAA15-C | | 1 | 1 | 1 | 1 | 1 | 1 | 1 |
| Laminate film |  |  | PP | PP | PP | PP | PP | PP | PP |
| Evaluation results | Laminate adhesion |  | P | P | P | P | P | P | P |
|  | Hydrofluoric acid resistance |  | B | A | B | B | A | A | B |
|  | Alkali resistance |  | B | A | B | B | A | A | B |

TABLE 6

|  |  |  | Comparative Example | | | | | | | | | |
|---|---|---|---|---|---|---|---|---|---|---|---|---|
|  |  |  | 1 | 2 | 3 | 4 | 5 | 6 | 7 | 8 | 9 | 10 |
| Chemical conversion treatment agent | Metal element (A) | Concentration (ppm) | 260 | — | 300 | 300 | 2000 | 3300 | 2000 | 3500 | — | 2000 |
|  |  | Type | a | — | a | b | a | a | a | a | — | a |
|  | Vanadium (B) | Concentration (ppm) | 3240 | 3500 | 220 | 220 | 1500 | 200 | 1500 | — | — | 1500 |
|  |  | Type | a | a | a | a | a | a | a | — | — | a |
|  | Resin (C1) | Concentration (ppm) | 4000 | 4000 | 4000 | 4000 | — | 4000 | 210 | 4000 | 4000 | — |
|  |  | Type | a | a | a | a | — | a | a | b | a | — |
|  | Resin (C2) | Concentration (ppm) | — | — | — | — | — | — | — | — | — | 4000 |
|  |  | Type | — | — | — | — | — | — | — | — | — | d |
|  | Surfactant | Concentration (ppm) | — | — | — | — | — | — | — | — | — | — |
|  |  | Type | — | — | — | — | — | — | — | — | — | — |
|  |  | $W_a/W_b$ | 0.08 | — | 1.36 | 1.25 | 1.37 | 16.50 | 1.33 | — | — | 1.33 |
|  |  | $(W_a + W_b)/W_c$ | 0.88 | 0.88 | 0.13 | 0.13 | — | 0.88 | 16.67 | 0.38 | — | 0.88 |
|  |  | $W_{c2}/(W_{c1} + W_{c2})$ | 0 | 0 | 0 | 0 | 0 | 0 | 0 | 0 | 0 | 1 |
|  |  | pH | 2.5 | 2.5 | 3 | 3 | 2.5 | 2.5 | 2.5 | 3 | 3 | 2.5 |

TABLE 6-continued

|  |  | Comparative Example | | | | | | | | | |
|---|---|---|---|---|---|---|---|---|---|---|---|
|  |  | 1 | 2 | 3 | 4 | 5 | 6 | 7 | 8 | 9 | 10 |
| Adhesion treating agent | EPOCROS WS-700 | 1 | 1 | 1 | 1 | 1 | 1 | 1 | 1 | 1 | 1 |
|  | PAA15-C | 1 | 1 | 1 | 1 | 1 | 1 | 1 | 1 | 1 | 1 |
| Laminate film |  | PP | PP | PP | PP | PP | PP | PP | PP | PP | PP |
| Evaluation results | Laminate adhesion | P | P | P | P | F | P | P | P | P | P |
|  | Hydrofluoric acid resistance | C | C | C | C | C | C | C | C | C | C |
|  | Alkali resistance | B | C | C | C | C | C | C | C | C | B |

The results of Table 1 to Table 6 revealed that, when using a chemical conversion agent including one, or two or more metal element(s) (A) selected from the group consisting of zirconium, titanium, and hafnium; a vanadium element (B); and a resin (C); in which the resin (C) includes a polyvinyl alcohol-based resin (C1) consisting of at least one of polyvinyl alcohol and a derivative thereof; the value of a ratio (Wa/Wb) of the mass-based total content (Wa) of the metal element (A) to the mass-based content (Wb) of the vanadium element (B) is 0.1-15, and the value of a ratio ((Wa+Wb)/Wc1) of the mass-based total content (Wa+Wb) of the metal element (A) and the vanadium element (B) to the mass-based total content (Wc1) of the polyvinyl alcohol-based resin (C1) is 0.25-15; it is possible to provide a chemical conversion coating film with excellent corrosion resistance and moisture resistance, and also to provide a chemical conversion coating film with excellent adhesion to a laminate film, and excellent hydrofluoric acid resistance and alkali resistance.

INDUSTRIAL APPLICABILITY

The chemical conversion agent of the present invention is preferably used for a surface treatment of die castings, heat exchangers, food containers, members for secondary battery and the like since the chemical conversion agent is capable of providing, for example, an aluminum-based metal material with excellent corrosion resistance and moisture resistance, while also providing the aluminum-based metal material with excellent adhesion with a laminate film, excellent hydrofluoric acid resistance and excellent alkali resistance.

The invention claimed is:

1. A chemical conversion agent comprising one, or two or more metal element(s) (A) selected from the group consisting of zirconium, titanium, and hafnium,
a vanadium element (B), and
a resin (C),
wherein the chemical coversion agent only includes, as the resin (C), a polyvinyl alcohol-based resin (C1) consisting of at least one of polyvinyl alcohol and a derivative thereof, and one, or two or more metal ion-crosslinkable polymer(s) (C2),
wherein a polymerization degree of the polyvinyl alcohol-based resin (C1) is 500 to 1,100,
wherein the metal ion-crosslinkable polymer (C2) is one, or two or more polymer(s) selected from the group consisting of polyacrylic acid, phosphoric acid polymer, phosphonic acid polymer, water-soluble or water-dispersible epoxy polymer, water-soluble or water-dispersible urethane-based polymer, and polyester,
wherein the value of a ratio (Wa/Wb) of the mass-based total content (Wa) of the metal element (A) to the mass-based content (Wb) of the vanadium element (B) is 0.1-15,
wherein the value of a ratio ((Wa+Wb)/Wc1) of the mass-based total content (Wa+Wb) of the metal element (A) and the vanadium element (B) to the mass-based total content (Wc1) of the polyvinyl alcohol-based resin (C1) is 0.25-15, and
wherein the value of a ratio (Wc2/(Wc1+Wc2)) of the mass-based total content (Wc2) of the metal ion-crosslinkable polymer (C2) to the mass-based total content (Wc1+Wc2) of the polyvinyl alcohol-based resin (C1) and the metal ion-crosslinkable polymer (C2) is 0.4 or less.

2. The chemical conversion agent according to claim 1, wherein the concentration of the metal element (A) in the chemical conversion agent is 50-100,000 ppm by mass,
wherein the concentration of the vanadium element (B) is 50-100,000 ppm by mass,
wherein the total concentration of the resin (C) is 50-100,000 ppm by mass, and
wherein a pH is 0.5-6.5.

3. The chemical conversion agent according to claim 1, wherein an average saponification degree of the polyvinyl alcohol-based resin (C1) is 80% or more.

4. The chemical conversion agent according to claim 1, which further includes a surfactant.

5. The chemical conversion agent according to claim 1, which is used for a surface treatment of an aluminum-based metal material.

6. A metal surface treatment method for treating a surface of a metal material, which comprises the steps of:
applying the chemical conversion agent according to claim 1 on the metal material, and drying the chemical conversion agent applied on the metal material.

* * * * *